(12) United States Patent
De Faria et al.

(10) Patent No.: US 8,789,062 B2
(45) Date of Patent: Jul. 22, 2014

(54) WORKLOAD MANAGEMENT OF A CONCURRENTLY ACCESSED DATABASE SERVER

(75) Inventors: Daniel Braga De Faria, Redwood City, CA (US); Mohit Aron, Los Altos, CA (US); Hariharan Kolam Govindarajan, Palo Alto, CA (US)

(73) Assignee: Teradata US, Inc., Dayton, OH (US)

( * ) Notice: Subject to any disclaimer, the term of this patent is extended or adjusted under 35 U.S.C. 154(b) by 343 days.

(21) Appl. No.: 13/079,821

(22) Filed: Apr. 5, 2011
(Under 37 CFR 1.47)

(65) Prior Publication Data
US 2012/0260256 A1 Oct. 11, 2012

(51) Int. Cl.
*G06F 9/46* (2006.01)
*G06F 15/173* (2006.01)
*G06F 17/30* (2006.01)

(52) U.S. Cl.
USPC ............................ 718/103; 709/226; 707/781

(58) Field of Classification Search
None
See application file for complete search history.

(56) References Cited

U.S. PATENT DOCUMENTS

| | | | |
|---|---|---|---|
| 2004/0225631 A1* | 11/2004 | Elnaffar et al. | 707/1 |
| 2009/0138582 A1* | 5/2009 | Turk | 709/223 |
| 2009/0276771 A1* | 11/2009 | Nickolov et al. | 717/177 |

* cited by examiner

*Primary Examiner* — Kenneth Tang
(74) *Attorney, Agent, or Firm* — Raj Abhyanker, P.C.; Randy L. Campbell, Jr.

(57) ABSTRACT

Several methods and a system of a workload management of a concurrently accessed database server are disclosed. In one embodiment, a method includes applying a weight to a service class. The method also includes generating a priority of the service class. In addition, the method includes selecting a group based on the weight of the service class. The method further includes determining a priority level based on the priority of the service class. The method also includes generating a characteristic of a shadow process through the weight and the priority of the service class. In addition, the method includes executing a query.

28 Claims, 3 Drawing Sheets

WORKLOAD MANAGEMENT OF A CONCURRENTLY ACCESSED DATABASE SERVER

FIELD OF TECHNOLOGY

This disclosure relates generally to the technical field of database management and, in one embodiment to a workload management of a concurrently accessed database server.

BACKGROUND

A user may concurrently access a database server. The user may execute different workloads with different demands on the database server. For example, one user may perform a short-running lookup query requiring a quick response time from the database server. In contrast, other users may perform a long-running query demanding high disk throughput from the system, as is common for decision support queries. The user may want to prioritize certain tasks and/or activities of a distributed database system. The user may want to control how a set of resources are allocated in the distributed database system. A set of activities may contend for a set of limited resources (i.e. CPU, memory, disk, network, etc.). The user may want to speed up certain processes and/or activities but may have no way to do so. As a result a set of key processes and/or activities may run slower than desired and decrease an efficiency of the system or cause it to crash.

SUMMARY

Several methods and a system of a workload management system providing workload management capabilities of a concurrently accessed database server are disclosed. In one aspect, a method includes creating a context object for an activity. The activity may define a set of processes. The method also includes mapping the context object to a service class. The method further includes generating a weight and a priority to the service class. The method further includes executing a set of processes associated with the activity based on the weight and the priority of the service class. The method also includes simultaneously allocating a set of resources at all nodes in a system based on the weight and the priority of the service class.

The method may further include creating the context object containing a set of properties associated with the activity. The method may further include creating a variable within the context object to represent at least a property. The method further includes associating the variable with a data type. The data type may be at least one of a simple type and a composite type. The method may further include designating a set of values corresponding to the variable at a corresponding stage in an execution pipeline preceding an execution of the activity.

The method further includes defining a set of operators to be used in a set of expressions involving a particular variable. The method may further include performing at least one of an acceptance and a rejection of the set of expressions based on the set of operators.

The method also includes defining a predicate associated with a workload type based on the set of variables and the set of operators. The method may also include evaluating the predicate against a particular context object instance to map the context object to a corresponding workload type.

The method may also include defining a workload type through a response of a system administrator. The method also includes collecting a set of relevant information in a set of context variables associated with the activity. The method also includes combining a set of activities with at least one shared property to the workload type based on a definition of the workload type. The method also includes categorizing the workload type based on the set of relevant information in the set of context variables associated with the workload type. The method may also include managing the set of processes in all activities for all workloads that map to the same service class as a single unit during resource allocation. The method may also include maintaining a workload table with a set of current definitions for a set of workload types.

Further, the method may include maintaining, through a Manager, a list of all active workload types. The method also includes sorting the list of all active workload types based on a value for an evaluating order variable of the workload type. The method further includes mapping the activity to a first workload type whose predicate is satisfied based on the context object of the activity. The method further includes determining the service class of the workload type based on the workload table.

The method may further include mapping the workload type to a corresponding service class based on the workload table. The method also includes processing a resource allocation based on the priority and the weight of the service class.

The method further includes dynamically allocating a set of resources to a set of all active service classes. The method may further include calculating an allocation of the set of resources as a function of the priority and the weight of the service class. The method also includes allocating the set of resources to the service class based on the weight and priority of the service class.

The method also includes simultaneously evaluating a group of multiple activities through the Manager.

The method may further include maximizing a system efficiency through a transaction-level admission control. The method also includes submitting a particular transaction to the transaction-level admission control through the Manager. The method also includes limiting a number of concurrent transactions based on a predetermined threshold level through the transaction-level admission control. The predetermined threshold level may be at least one of a single value set for the entire system, a set of different values customized per service class and a set of different values customized per workload type.

When the predetermined threshold level is the single value for the entire system, the method may also include queuing a particular transaction when the number of concurrent transactions is above the predetermined threshold level. The method also includes accepting the particular transaction when the number of concurrent transactions is below the predetermined threshold level based on the priority and the weight of the service class the activity issuing the transaction is mapped to when the predetermined threshold level is the single value for the entire system.

The method may further include allocating the set of resources based on the priority and the weight of the service class through a dynamic resource allocation system. The method also includes dynamically allocating the set of resources at all nodes of a distributed database system when at least two nodes execute a set of processes associated with a single activity.

The method further includes mapping, through the Manager, the workload type and the service class of a particular user session. The method also includes automatically notifying a Slave server at a particular node, through the Manager, when a first activity in the particular user session begins. The method also includes automatically notifying the Slave server when a subsequent activity in the particular user session is classified to a different service class. The method may also include allocating the set of resources at the particular node, through the Slave server based on the notification received from the Manager. The method further includes mapping a set of values associated with the priority and the weight received from the Manager to a set of configuration parameters related to resource allocation.

The method may further include consistently utilizing the set of resources according to the weight and the priority at the particular node notwithstanding a number of processes in a given service class. The method also includes reevaluating a utilization of the set of resources when a set of active service classes changes.

The method may also include automatically dividing the set of resources between a set of active service classes. The method also includes periodically reevaluating a set of active activities to reclassify a given activity to a different workload type and a different service class.

The method further includes allocating the set of resources based on the weight and the priority of the given service class independently of a number of workload types mapped to the given service class.

In another aspect, a machine-readable medium providing instructions, which when read by a processor cause a machine to perform operations includes mapping a context object associated with an activity to a service class. The machine-readable medium further includes generating a weight and a priority to the service class. The machine-readable medium further includes simultaneously allocating a set of resources at all nodes in a system based on the weight and the priority of the service class.

The machine-readable medium also includes creating the context object containing a set of properties associated with the activity. The machine-readable medium may further include creating a variable within the context object to represent a property. The machine-readable medium further includes associating the variable with a data type. The machine-readable medium may further include designating a set of values corresponding to the property. The machine-readable medium may also include managing an execution pipeline such that a set of activities are executed based on the set of values.

The machine-readable medium also includes defining a workload type. The machine-readable medium may also include defining a predicate associated with the workload type based on the set of variables and the set of operators. The machine-readable medium further includes evaluating the predicate against a particular context object instance to map the context object to a corresponding workload type.

The machine-readable medium may also include combining a set of activities that contain at least one shared property to a particular workload type based on a definition of the particular workload type. The machine-readable medium also includes categorizing the workload type based on a set of context variables associated with the workload type. The machine-readable medium may also include managing the set of processes in all activities for all workloads that map to the same service class as a single unit during resource allocation.

The machine-readable medium may further include mapping the activity to a first workload type whose predicate is satisfied by the context object of the activity. The machine-readable medium also includes determining the service class of the workload type based on the set of definitions in the workload table.

The machine-readable medium also includes determining a proportion of resources to be allocated to a particular service class based on a function of the priority and the weight of the service class relative to the priorities and the weights of all active service classes. The machine-readable medium may also include dynamically allocating the set of resources to the service class.

The machine-readable medium may further include submitting a particular transaction in an activity to a transaction-level admission control through a Manager. The machine-readable medium also includes limiting a number of concurrent transactions based on a predetermined threshold level through the transaction-level admission control. The predetermined threshold level may be at least one of a single value set for the entire system, a set of different values customized per service class and a set of different values customized per workload type.

The machine-readable medium further includes mapping, through the Manager, the workload type and the service class of a particular user session. The machine-readable medium may also include automatically notifying a Slave server at a particular node, through the Manager, when a first activity in the particular user session begins. The machine-readable medium may further include automatically notifying the Slave server when a subsequent activity in the particular user session is classified to a different service class. The machine-readable medium also includes allocating the set of resources at the particular node, through the Slave server based on the notification received from the Manager. The machine-readable medium may also include mapping a set of values associated with the priority and the weight received from the Manager to a set of configuration parameters related to resource allocation.

In yet another aspect, a system includes a session server to register an activity requested through a user in a session. The system also includes a Manager to map a workload type of a particular session, to determine a service class of the workload type based on a workload table, to generate a weight and a priority of the service class and to communicate with a set of slave servers executing a resource allocation. The system also includes a Slave server to allocate a set of resources at a particular node based on a notification of the Manager and to map a set of values associated with the priority and the weight received from the Manager to a set of configuration parameters associated with the resource allocation.

The system may further include a context object to store a set of variables associated with the activity.

The manager may evaluate a predicate against the context object instance to map the context object to a corresponding workload type.

The manager may also submit the activity to a transaction-level admission control to limit a number of concurrent activities based on a predetermined threshold level.

BRIEF DESCRIPTION OF THE VIEWS OF DRAWINGS

Example embodiments are illustrated by way of example and not limitation in the figures of accompanying drawings, in which like references indicate similar elements and in which.

Other features of the present embodiments will be apparent from accompanying Drawings and from the Detailed Description that follows.

DETAILED DESCRIPTION

Example embodiments, as described below, may be used to provide a workload management of a concurrently accessed database server. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments. Although the present embodiments have been described with reference to specific example embodiments, it will be evident that various modifications and changes may be made to these embodiments without departing from the broader spirit and scope of the various embodiments.

Figure 1:
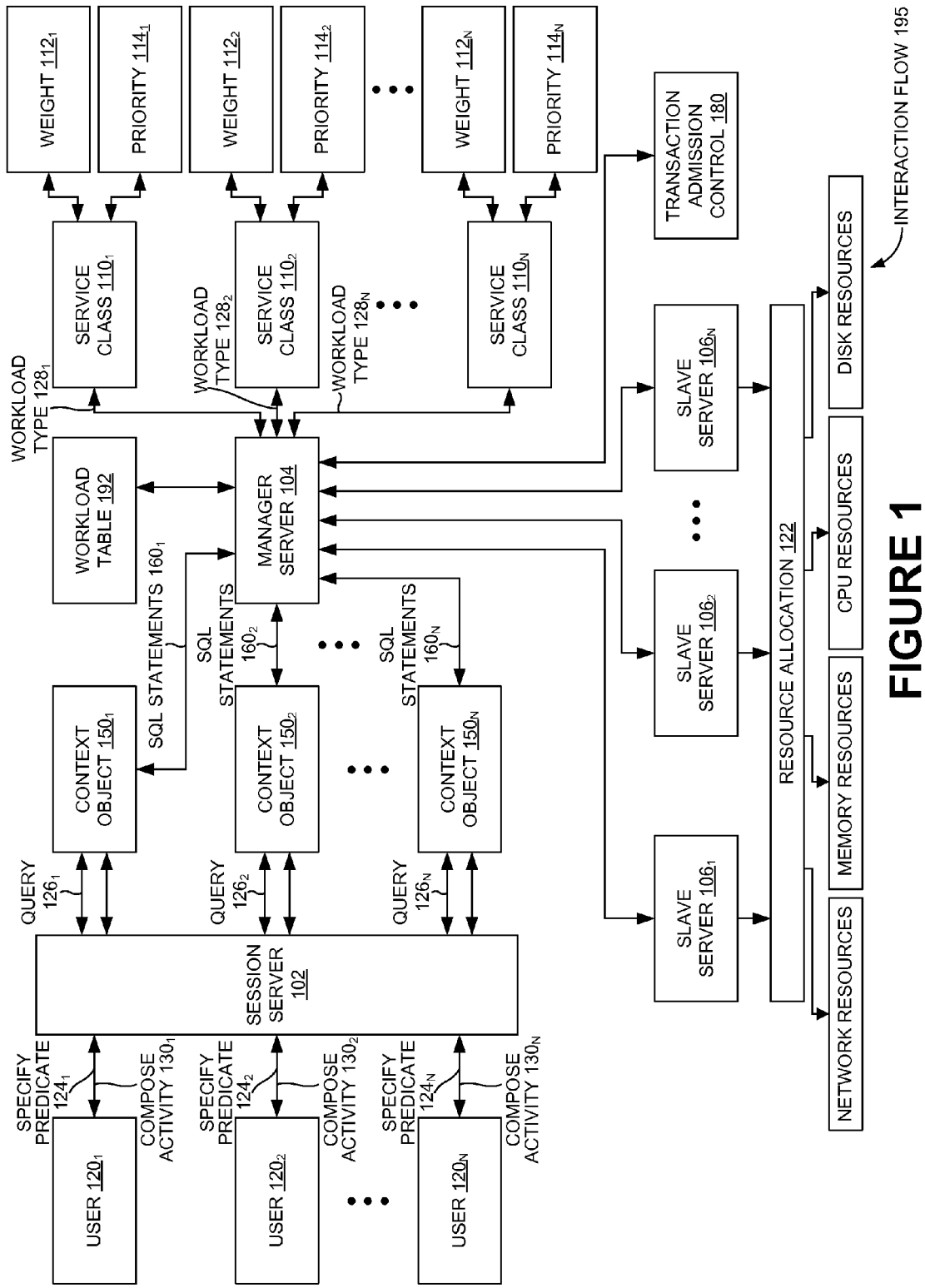
FIG. 1 is a system view illustrating an interaction flow in a system, according to one or more embodiments.

FIG. 1 is a system view illustrating an interaction flow, according to one or more embodiments. FIG. 1 shows a user 120, an activity 130, a rule 124, a session server 102, a query 126, a context object 150, an SQL statement 160, a workload table 192, a manager 104, a service class 110, a workload type 128, a weight 112, a priority 114, a transaction-level admission control 180 and a slave server 106. Embodiments described herein may be designed for environments, for example, data warehouses for parallel processing multiple workloads through dynamic resource allocation for optimum performance with various workloads. Embodiments described herein may be designed to maximize a system efficiency and system utility. In one or more embodiments, the system described herein may enable an administrator of the system to create rules for workloads. Furthermore, in one or more embodiments, executions of a set of transactions may be controlled through a transaction-level administration control.

In one or more embodiments, a user 120 may submit an activity 130 to the system. In one or more embodiments, the database server may be a hardware and/or a software that provides database services. In one or more embodiments, a user session associated with the user 120 may be established. In one or more embodiments, a session server 102 may be designated to the user session 102. In one or more embodiments, the session server 102 may be a software/hardware module that may manage the activities 130 from the user 120. In one or more embodiments, a unique identifier 190 may be used to identify the user session. As the session is established, the user 120 may be permitted to submit an activity 130. The activity 130 may be a statement, like an SQL statement. In one or more embodiments, the activity 130 may be registered by the session server. The activity 130 may be associated with a context object 150 in one or more embodiments. The context object 150 may contain a set of information needed to classify the activity correctly into an appropriate workload in one or more embodiments. In one or more embodiment, a system administrator may define a set of workload types, and each workload type 128 may map to a service class 110. During workload classification, the activity 130 may have the context object 150 compared to a workload definition, as defined by the system administrator until a match is found, and the statement 130 is then mapped to the service class 110 that the workload type is assigned to. In one or more embodiments, the service class 110 may be associated with a weight 112 and a priority 114. The system may use a set of weights 112 and a set of priorities 114 to prioritize the execution of all processes executing under the service class. In one or more embodiments, the activity 130 executing under the service class 110 may have all its processes running under the priority 114 of that service class 110. In one or more embodiments, a transaction-level admission control 180 may control the priorities of a set of incoming transactions when the system is over-subscribed. After the transaction is admitted, a dynamic resource allocation module may ensure that all processes running on behalf of the activity 130 are properly prioritized at all nodes in the system, therefore controlling resource utilization according to the guidelines defined by the system administrator, in one or more embodiments.

In one or more embodiments, the context object 150 may be created to contain a set of properties of the activity 130 that may be relevant to workload classification. For example, the system, may collect a set of information (e.g. information about the user 120 that submitted the query, the database that the user 120 may be connected to, a set of tables or other data sources used, an estimated execution cost for the activity 130, a time the statement was submitted, a current execution time, etc.). This set of information containing the properties mentioned above represent the context object 150 that will be taken into account when defining the priority 114 under which the activity 130 should be executed.

A variable may be created within the context object 150 to represent each property of the context object 150 and a value associated with the property in one or more embodiments. For example, a username variable may be defined to contain a single string value. In one or more embodiments, the variable may be represented by a simple type or a composite type. For example, a simple type may be a string (e.g. username) and a composite type may be a set of table names references directly or indirectly in an SQL statement that may be represented as a set of array of strings. The variable may be associated with an appropriate type in one or more embodiments. For example, while the username variable may be represented using a string value, a variable containing the current date and time may be more properly represented using a timestamp value. In another example, the variable for the estimated cost for a statement may be represented with a numeric type value.

Similarly, other activities may be similarly classified. For example, services such as backups, data replication, data loads, and data partitioning may be prioritized in the same way. They may be associated with an associated context object and after classification, a set of all processes responsible for their execution may be prioritized together in one or more embodiments.

The set of variables may have values set at different stages in an execution pipeline that may precede an actual execution of the activity in one or more embodiments. For example, when the variable is a database to which the user 120 may be connected to, or the IP address of the user's machine, the variable may only need to be populated once when the connection to the system is established. In another example, when the variable is a transaction-level variable, like a transaction start time, the variable may only be populated when a new transaction starts. In yet another example, variables such as the type of a SQL statement may be submitted or a table name referenced by the SQL statement may need to be populated for every statement executed as part of an activity. Finally, variables such as a current date or current time may be evaluated to a different value every time a classification happens. For example, a variable that may be collected and saved in the context object 150 may be a user name, a set of roles that a current user has been directly or indirectly granted, a name of the database to which the user is connected, an IP address and other information about the network the client is connecting from, a set of roles the current user has been granted either directly or indirectly, a time the user connects to the system, a current time, an application used to submit the statement or activity, a type of statement or activity submitted, a set of functions and operators used in the statement or activity, an estimated cost for the statement or activity, a set of join operators employed in the query, a start and elapsed time for the current statement or activity, and a state and elapsed time for the current statement or activity.

The context object 150 may be represented using a data type, in one or more embodiments. The system may also use a predicate language that may allow the system administrator to combine a set of available variables into a set of rules that can be used to map the activity 130 to a workload type 128 in one or more embodiments.

The variable may be associated with the data type that best represents the variable in one or more embodiments. For example, the username variable may be represented by a single VARCHAR value, but the variable for statement elapsed time may be represented as an INTERVAL. Further, the variable for cost of the selected execution plan may be represented by an ARRAY of VARCHAR values. The framework may be defined so that a user 120 may use both an existing data type as well as user-defined data types whenever supported by the underlying database. A variable that may not be explicitly assigned a value may be represented by the SQL NULL value.

In one or more embodiments, the data type associated with the variable may also define a set of operators that may be used in an expression involving the variable. For example, an expression like "username='john'" may be valid based on the data type of the variable, while an expression like "username>1000" may be automatically rejected by the system. The system may also allow for the user of SQL-specific operators and functions that may be both predefined and user-defined. For example, if a function stmtclass is defined to return the statement class for a given value of the stmtType variable, the user can create an expression including a clause such as "stmtclass(stmttype='DDL')".

In one or more embodiments, the user 120 may also use the set of defined variables and their supported operators to define a predicate 124 that may be evaluated against the context object 150. In one or more embodiments, when SQL is the representation language, the predicate 124 may be written as any SQL-compliant expression involving the defined variables that may be successfully casted to a Boolean value. Each predicate may reference any subset of defined variables. The context object may be matched against a workload definition based on the predicate, in one or more embodiments.

In one or more embodiments, the activity 130 may be mapped to the service class 110 that may in turn be dynamically assigned a share of the resources in the system. The resources may include, CPU, memory, disk throughput and utilization and network bandwidth. In one or more embodiments, the statement or activity 130 may be first mapped to a workload type 128 and the workload type may then be mapped to a service class 110.

The workload type 128 may define a set of activities and other tasks with shared properties from the perspective of the system administrator in one or more embodiments. The statement or activity 130 that may be mapped to the workload type 128 may be managed as a single unit during resource allocation in one or more embodiments. For example, all ETL processes may be grouped into the "LOADS" workload type. Further it may be common for ETL processes to employ a specific username for this purpose such that one way to define the "LOADS" workload type may be to map all activities and statements executed by the ETL user. In another example, a "REPORTS" workload type may be defined as all the SELECT queries executed against a given table in the database, irrespective of which users submit them. In one or more embodiments, the workload type definitions may be different at each deployment. In another embodiment, the system may ensure that a set of relevant information is collected in the context object 150 such that the workload definitions can successfully represent the categorization targeted by the system administrator.

The system administrator may control the classification process by first defining a set of active workload types in one or more embodiments. In one or more embodiments, the system may contain a workload table 192 with a list of all workload types that are currently defined. For example, a set of properties of each workload definition may include a name of the workload type (e.g. "LOADS", "REPORTS"), a predicate defining the workload type (e.g. an expression like "username='john'" and "estimatedcost>1000)), an evaluation order of the workload type (e.g. a unique integral value that defines the order in which a set of workload types should be evaluated), the service class (e.g. a name of the service class under which the workload type should be executed), an active status of the workload type.

In one or more embodiments, the system administrator may use several strategies to define workload types, including user-based workload definitions, object based workload definitions, action-based workload definitions, time-based workload definitions, location-based workload definitions, and hybrid workload definitions that employ many of these approaches. The user-based workload definition may be defined as all the actions performed by a user or a group of users in one or more embodiments. For example, if all members of the SALES team have been granted the sales role, a "SalesDept" workload may be defined as all the actions performed by any user that has been granted sales privileges. In one or more embodiments, the object-based workload definition may depend on the tables, databases and other data structures used in the statement or activity 130. In one or more embodiments, the action-based workload definition may be defined using information such as a type of SQL statement being executed, or the activity being executed or the set of operators being used in a query. In one or more embodiments, the time-based workload definition may make use of the current time as well as a time of a statement transaction, a session start time and a session elapsed time. In one or more embodiments, a location-based workload definition may use a set of information about the client's location, such as the network from which he is connecting to the database. In one or more embodiments, the hybrid workload definition may include any or a combination of the above stated approaches to workload definition to form a single SQL-compliant predicate.

In one or more embodiments, the service class 110 may be an entity that may be prioritized by the system administrator. For example, a set of properties of each service class may include a name of the service class, a priority of the service class and a weight of the service class. The priority of the service class 110 may be a numeric value that may define the priority of the service class 110 in one or more embodiments. A process executing on behalf of the service class 110 with a higher priority may be given precedence when accessing an available hardware resource, in one or more embodiments. The weight of the service class 110 may be another numeric value that may define the weight of the service class. For two service classes having the same numeric value for priority, the ratio of their weights may define the targeted share of resources, in one or more embodiments. For example, the system may allocate two times more resources to a service class with a weight of 100 to a second service class with a weight of 50 if they are configured with the same priority.

In one or more embodiments, the set of resources may be allocated based on the weight and the priority of the service class. The set of resources may be CPU resources, disk resources, memory resources or network resources or all of the aforementioned resources, in one or more embodiments. In one or more embodiments, resource allocation may be performed per service class 110 independently of a number of active workload types mapping to each service class 110 and the number and types of processes executing on their behalf. For example, when two service classes with the same priority execute with weights having a ratio of 2:1 ratio and require substantial CPU resources, the system may strive to allocate twice as much CPU time to the high-priority class even if a single process executes under the high-priority class and competes with 1000 processes under the class with the lower priority.

In one or more embodiments, the system may dynamically allocate a set of resources to all active service classes. In one or more embodiments, the share of resources assigned to the service class may be a function of the priority and weight of one service class when compared to the priority and weight of the other service class with at least one process being executed.

The Manager 104 may map the activity 130 to the service class 110 in one or more embodiments. In one or more embodiments, the context object 150 may first be built and assigned variable values. The Manager 104 may then maintain a list of all active workload types and sort the workload types by the values for evaluation attribute. The activity 130 may then be mapped to the first workload type in the list that matches context object 150 of the activity 130, in one or more embodiments. When the workload type 128 is defined, the Manager 104 may perform a table lookup to determine the service class 110 that the workload type 128 may be mapped to, in one or more embodiments. The activity may stay associated with that particular service class and its associated priority and weight until classification is performed again, in one or more embodiments. The Manager 104 may then use a set of results associated with the classification process during transaction-level admission control and for dynamic resource allocation, in one or more embodiments. In one or more embodiments, the Manager 104 may evaluate multiple activities in parallel or in batches to amortize a set of evaluation costs.

The transaction-level admission control 180 may limit a number of concurrent transactions in the system to a predetermined threshold level, in one or more embodiments. In one or more embodiments, the transaction level admission control 180 may enqueue an admission request of a particular transaction when the number of concurrent transactions is above the predetermined threshold level, while a set of corresponding transactions remain enqueued. The transaction-level admission control 180 may accept the particular transaction when active transactions complete in one or more embodiments. In one or more embodiments, the transaction-level admission control may accept the particular transaction based on the priority and the weight of the particular transaction. As soon as a particular active transaction is completed, the system inspects all the enqueued requests and selects one to go through.

When the number of concurrent transactions is less than the predetermined threshold level, then the transaction-level admission control accepts all transactions, in one or more embodiments. In one or more embodiments, the system may allow different values for the predetermined threshold level. The predetermined threshold level may be a single value set for the entire system, a set of different values customized per service class and a set of different values customized per workload type, in one or more embodiments.

In one or more embodiments, when a transaction is submitted as part of an activity through the user 120, the context object 150 may be built, and the system may classify the workload type and map the workload type to the service class 110. A transaction admission request may then be submitted to the Manager 104 containing a set of results of the classification in one or more embodiments. If a number of concurrent transactions current executing is at the predetermined threshold level the transaction admission request may be enqueued according to the priority and the weight assigned to the service class 110 to which the activity has been mapped. In one or more embodiments, when an active transaction completes, the Manager 104 may dequeue the transaction admission request from the set of transaction admission request with the highest priority. In one or more embodiments, if multiple service classes with the same priority have transaction admission requests enqueued, the system may admit transactions from those service classes following the ratio of the weights assigned to those service classes. For example, if two service classes with weights 100 and 20 have multiple transactions waiting for admission, the system may admit approximately 5 times more transactions from the service class with the higher weight when compared to the other service class.

In one or more embodiments, the transaction-level admission control 180 may dictate when the transaction starts, but may have no control over the resources used by the statements or activities in each transaction once the admission has been granted. In another embodiment, the system may use a dynamic resource allocation mechanism to ensure that during an execution of the statement or activity, the statement or activity may be provided with a share of resources according to the priority and the weight of the service classes to which they are mapped.

In one or more embodiments, the dynamic resource allocation mechanism may be performed at all nodes in the distributed database system because all the nodes may execute a set of processes that act on behalf of a single statement or activity. In one or more embodiments, the Manager 104 may keep a mapping between each session and its workload type and service class. When a first activity in a session goes through a workload classification, or when a second activity is mapped to a different service class, the Manager 104 may notify all nodes in the system of the new classification results for that session, in one or more embodiments. The Manager 104 may send a notification to a Slave server 106 that may be running at all nodes in the system. The Slave server 106 may receive a set of classification results/notifications from the Manager and may change the priorities of the processes running on that node on behalf of the given session or activity in one or more activities.

In one or more embodiments, the slave server 106 running at a particular node may be responsible for managing an allocation of resources for all processes executing at the particular node. The slave server 106 may keep a mapping between sessions and local processes and may change the share of resources allocated to these processes when a notification for that session is received from the Manager 104, in one or more embodiments.

The slave server 106 may map the values for priority and weight received from the Manager 104 to the configuration parameters expected by the operating system building blocks used to control allocation of resources such as CPU, I/O, memory and network, in one or more embodiments.

In one or more embodiments, a set of all processes executing at a given node on behalf of a given service class may make use of a share of the local resources that is a function of the priority and the weight assigned to the given service class. The share of the local resources may stay approximately the same independently of the number of processes per service class, and may change only when the set of active service classes change, in one or more embodiments.

In one or more embodiments, the system may automatically divide all available resources between the set of active service classes such that a single active service class may get all the available resources in the system irrespective of the priority and the weight of the service class. In one or more embodiments, the system may periodically re-evaluate the set of all active statements or activities such that even a single activity may be mapped to different service classes over a period of time. For example, if an activity is mapped to a workload with a predicate that is only true between 8 AM and 9 AM local time, the activity may be mapped to a different workload type after 9 AM.

Figure 2:
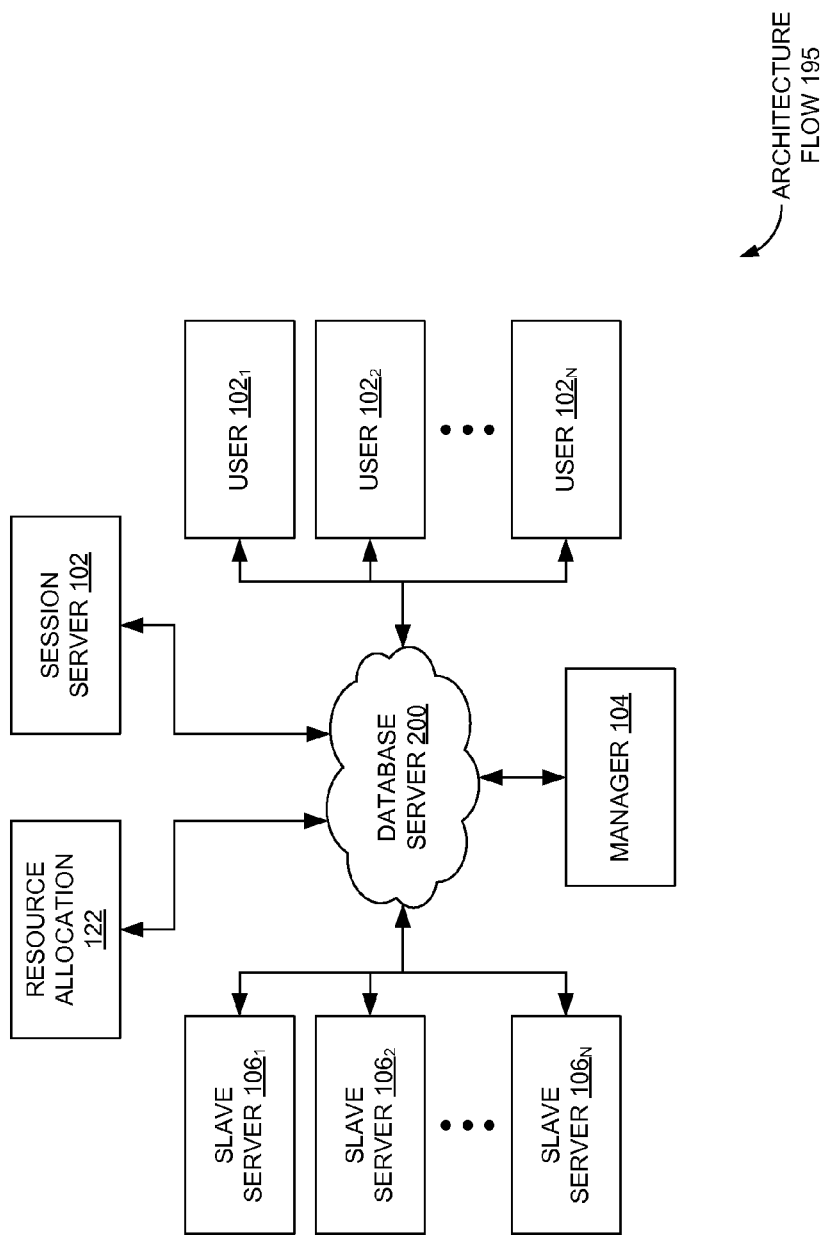
FIG. 2 is a system view illustrating an architecture flow in the system, according to one or more embodiments.

FIG. 2 is a system view illustrating an architecture flow 295, according to one or more embodiments. A database server 200 may be a hardware and/or a computer program that provides database services to the users $120_{1-N}$. The database server 200 may be capable of processing several kinds of activities submitted by the users $120_{1-N}$. In one example embodiment, the database server 200 may be deployed in data warehouses for supporting queries by providing responses. Furthermore, in one or more embodiments, the architecture flow may be controlled through the database server 200.

In one or more embodiments, the user $120_{1-N}$ may submit the activity 130. In one or more embodiments, the user $120_{1-N}$ may be an administrator, a business analyst or a front desk support executive.

In one or more embodiments, a predicate $124_{1-N}$ may also be provided by a system administrator of the system specifying a preference. In one or more embodiments, the predicate $124_{1-N}$ may be associated with a workload type and may be used to map the context object 150 to the service class 110.

In one or more embodiments, the workload type $128_{1-N}$ may be mapped to an appropriate service class $110_{1-N}$ by the Manager 104. In one or more embodiments, a workload table 192 may be consulted by the Manager 104 to map the workload type to the service class 110. In one or more embodiments, priorities of the service class 110 may be generated and appropriate weights may be applied to the service class 110.

In one or more embodiments, the slave server 106 may execute a set of processes at the various nodes of the system based on a set of instructions given by the Manager 104.

Figure 3:
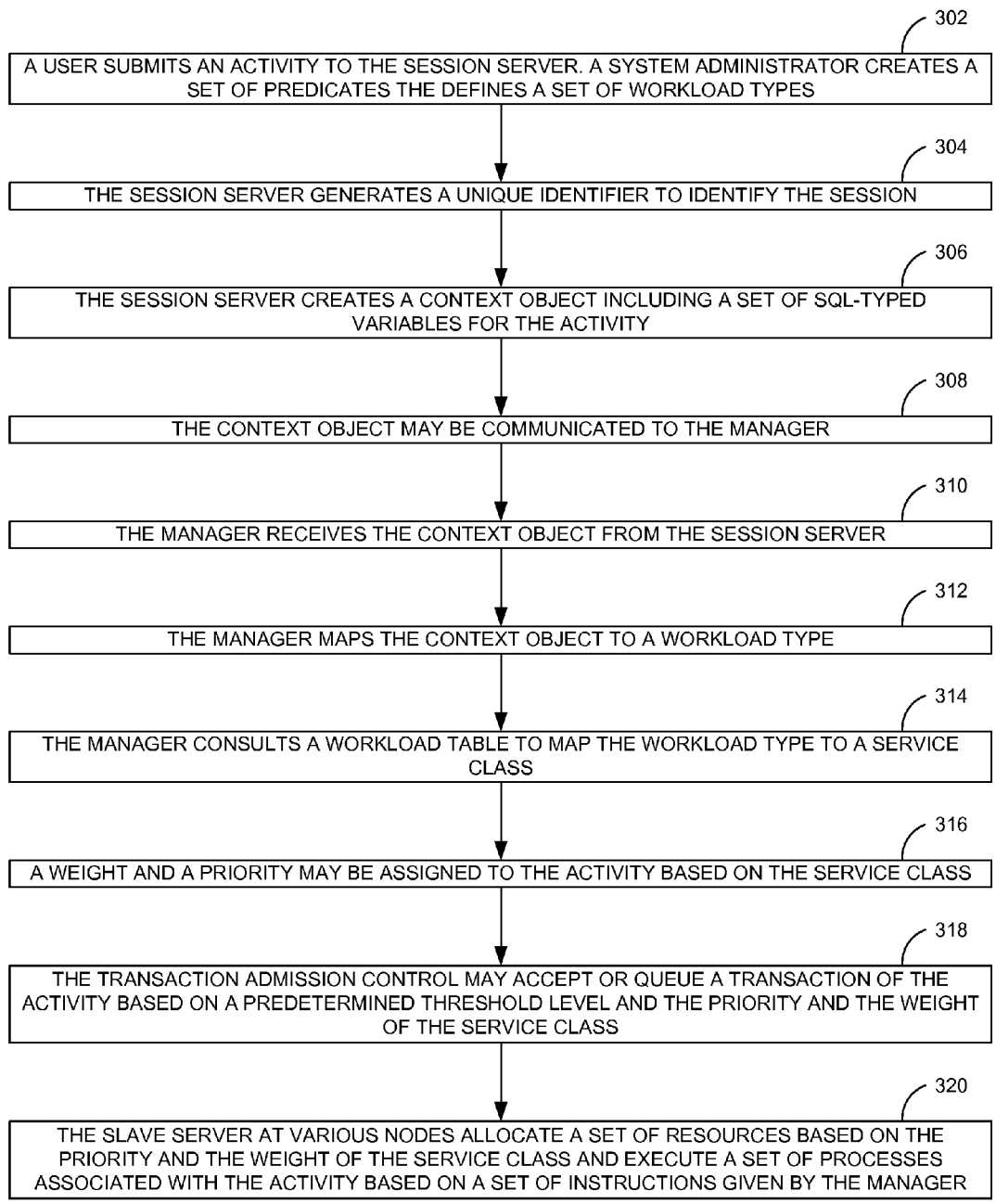
FIG. 3 is a path flow diagram illustrating operations of dynamic workload management, according to one or more embodiments.

FIG. 3 is a critical path flow diagram illustrating operations of dynamic workload management, according to one or more embodiments. In operation 302, an activity $130_{1-N}$ may be submitted by the user 120. A system administrator may also create a set of predicates that may define a set of workload types. In operation 304, a unique identifier $190_{1-N}$ may be generated by the sessionserver 102 to identify the session. In operation 306, a context object $150_{1-N}$ that may include set of SQL-typed variables may be created for the activity $130_{1-N}$. In operation 308, the context object $150_{1-N}$ may be communicated to the Manager 104. In operation 310, the context object $150_{1-N}$ from the sessionserver 102 may be received by the management server 104.

In operation 312, the Manager 104 may map the context object to a workload type. In step 314, the Manager may consult a workload table 192 to map the workload type 128 to the service class 110. In operation 316, a weight $112_{1-N}$ and a priority $114_{1-N}$ may be assigned by the service class 110 to the activity $130_{1-N}$. In operation 318, a transaction of the activity may be accepted or queued by the transaction admission control 180 based on a value of the predetermined threshold level and the priority and the weight of the service class the transaction belongs to.

In operation 320, the slaveservers 106 at the various nodes of the system allocate a set of resources based on the priority and the weight of the service class and execute a set of processes associated with the activity based on a set of instructions of the Manager 104.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A method comprising:
   generating a plurality of service classes, wherein each service class is defined by a respective weight and priority that indicates a respective level of resource usage dedicated to execution of each associated database-related action as compared to other database-related actions respectively associated with different service classes;
   creating a context object for an activity, wherein the activity defines a set of processes associated with at least one database-related action in a database system, and wherein the context object includes information associated with a database-workload type of the activity;
   mapping the context object to a service class from the plurality of service classes based on the information associated with the database-workload type of the activity;
   simultaneously allocating a set of resources at all nodes in the database system based on the weight and priority of the service class; and
   executing the set of processes associated with the activity based on the respective weight and the priority of the service class.

2. The method of claim 1 further comprising:
   creating the context object containing a set of properties associated with the activity;
   creating a variable within the context object to represent at least a property;
   associating the variable with a data type, wherein the data type is at least one of a simple type and a composite type, wherein the simple type comprises a single data type;
   designating a set of values corresponding to the property; and
   setting the value corresponding to the variable at a corresponding stage in an execution pipeline preceding an execution of the activity.

3. The method of claim 2 further comprising:
   defining a set of operators to be used in a set of expressions involving a particular variable; and
   performing at least one of an acceptance and a rejection of the set of expressions based on the set of operators.

4. The method of claim 3 further comprising:
defining a predicate associated with a workload type based on the set of variables and the set of operators; and
evaluating the predicate against a particular context object instance to map the context object to a corresponding workload type.

5. The method of claim 4 further comprising:
defining a workload type through a response of a system administrator;
collecting a set of relevant information in a set of context variables associated with the activity;
combining a set of activities with at least one shared property to the workload type based on a definition of the workload type;
categorizing the workload type based on the set of relevant information in the set of context variables associated with the workload type;
managing the set of processes in all activities for all workloads that map to the same service class as a single unit during resource allocation; and
maintaining a workload table with a set of current definitions for a set of workload types.

6. The method of claim 5 further comprising:
maintaining, through a Manager, a list of all active workload types;
sorting the list of all active workload types based on a value for an evaluation order variable of the workload type;
mapping the activity to a first workload type whose predicate is satisfied based on the context object of the activity; and
determining the service class of the workload type based on the workload table.

7. The method of claim 6 further comprising:
mapping the workload type to a corresponding service class based on the workload table; and
processing a resource allocation based on the priority and the weight of the service class.

8. The method of claim 7 further comprising:
dynamically allocating a set of resources to a set of all active service classes;
calculating an allocation of the set of resources as a function of the priority and the weight of the service class; and
allocating the set of resources to the service class based on the weight and the priority of the service class.

9. The method of claim 8 further comprising:
simultaneously evaluating a group of multiple activities through the Manager.

10. The method of claim 9 further comprising:
maximizing a system efficiency through a transaction-level admission control;
submitting a particular transaction to the transaction-level admission control through the Manager; and
limiting a number of concurrent transactions based on a predetermined threshold level through the transaction-level admission control, wherein the predetermined threshold level is at least one of a single value set for the entire system, a set of different values customized per service class and a set of different values customized per workload type.

11. The method of claim 10 further comprising:
when the predetermined threshold level is the single value set for the entire system, queuing a particular transaction when the number of concurrent transactions is above the predetermined threshold level; and
accepting the particular transaction when the number of concurrent transactions is below the predetermined threshold level based on the priority and the weight of the activity issuing the transaction is mapped to.

12. The method of claim 11 further comprising:
allocating the set of resources based on the priority and the weight of the service class through a dynamic resource allocation system; and
dynamically allocating the set of resources at all nodes of a distributed database system when at least two nodes execute a set of processes associated with a single activity.

13. The method of claim 12 further comprising:
mapping, through the Manager, the workload type and the service class of a particular user session;
automatically notifying a Slave server at a particular node, through the Manager, when a first activity in the particular user session begins;
automatically notifying the Slave server when a subsequent activity in the particular user session is classified to a different service class;
allocating the set of resources at the particular node, through the Slave server based on the notification received from the Manager; and
mapping a set of values associated with the priority and the weight received from the Manager to a set of configuration parameters related to resource allocation.

14. The method of claim 13 further comprising:
consistently utilizing the set of resources according to the weight and the priority at the particular node notwithstanding a number of processes in a given service class; and
reevaluating a utilization of the set of resources when a set of active service classes changes.

15. The method of claim 14 further comprising:
automatically dividing the set of resources between a set of active service classes; and
periodically reevaluating a set of active activities to reclassify a given activity to a different workload type and a different service class.

16. The method of claim 15 further comprising:
allocating the set of resources based on the weight and the priority of the given service class independently of a number of workload types mapped to the given service class.

17. A non-transitory machine-readable medium providing instructions, which when read by a processor cause a machine to perform operations, comprising:
generating a plurality of service classes, wherein each service class is defined by a respective weight and priority that indicates a respective level of resource usage dedicated to execution of each associated database-related action as compared to other database-related actions respectively associated with different service classes;
creating a context object containing a set of database-workload properties associated with the activity, wherein the activity defines a set of processes associated with at least one database-related action in a database system;
mapping the context object associated with an activity to a service class from the plurality of service classes; and
simultaneously allocating a set of resources at all nodes in a system based on the weight and the priority of the service class.

18. The non-transitory machine-readable medium of claim 17 further comprising:
creating a variable within the context object to represent a database-workload property;

associating the variable with a data type;
designating a set of values corresponding to the property; and
managing an execution pipeline such that a set of activities are executed based on the set of values.

19. The non-transitory machine-readable medium of claim 18 further comprising:
defining a workload type;
defining a predicate associated with the workload type based on the set of variables and the set of operators; and
evaluating the predicate against a particular context object instance to map the context object to a corresponding workload type.

20. The non-transitory machine-readable medium of claim 19 further comprising:
combining a set of activities that contain at least one shared database-workload property to a particular workload type based on a definition of the particular workload type;
categorizing the workload type based on a set of context variables associated with the workload type;
managing the set of processes in all activities for all workloads that map to the same service class as a single unit during resource allocation; and
maintaining a workload table with a set of current definitions for a set of workload types.

21. The non-transitory machine-readable medium of claim 20 further comprising:
mapping the activity to a first workload type whose predicate is satisfied by the context object of the activity; and
determining the service class of the workload type based on the set of definitions in the workload table.

22. The non-transitory machine-readable medium of claim 21 further comprising:
determining a proportion of resources to be allocated to a particular service class based on a function of the priority and the weight of the service class relative to the priorities and the weights of all active service classes; and
dynamically allocating the set of resources to the service class.

23. The non-transitory machine-readable medium of claim 22 further comprising:
submitting a particular transaction in an activity to a transaction-level admission control through a Manager; and
limiting a number of concurrent transactions based on a predetermined threshold level through the transaction-level admission control, wherein the predetermined threshold level is at least one of a single value set for the entire system, a set of different values customized per service class and a set of different values customized per workload type.

24. The non-transitory machine-readable medium of claim 23 further comprising:
mapping, through the Manager, the workload type and the service class of a particular user session;
automatically notifying a Slave server at a particular node, through the Manager, when a first activity in the particular user session begins;
automatically notifying the Slave server when a subsequent activity in the particular user session is classified to a different service class;
allocating the set of resources at the particular node, through the Slave server based on the notification received from the Manager; and
mapping a set of values associated with the priority and the weight received from the Manager to a set of configuration parameters related to resource allocation.

25. A system comprising:
a session server to register an activity requested through a user in a session;
a Manager to:
map a database workload type of a particular session, determine a service class from a plurality of service classes of the database workload type based on a workload table, wherein each service class is defined by a respective weight and priority that indicates a respective level of resource usage dedicated to execution of each associated database-related action as compared to other database-related actions respectively associated with different service classes, and communicate with a set of slave servers executing a resource allocation; and
a slave server to:
allocate a set of resources at a particular node based on a notification of the Manager;
map a set of values associated with the priority and the weight received from the Manager to a set of configuration parameters associated with the resource allocation.

26. The system of claim 25 further comprising:
a context object to store a set of variables associated with the activity.

27. The system of claim 26 wherein the Manager evaluates a predicate against the context object instance to map the context object to a corresponding database workload type.

28. The system of claim 27 wherein the Manager submits the activity to a transaction level admission control to limit a number of concurrent activities based on a predetermined threshold level.

* * * * *